United States Patent [19]

Kmak et al.

[11] 3,941,682

[45] Mar. 2, 1976

[54] REGENERATION PROCEDURE

[75] Inventors: Walter S. Kmak, Scotch Plains; David J. C. Yates, Westfield, both of N.J.

[73] Assignee: Exxon Research and Engineering Company, Linden, N.J.

[22] Filed: Aug. 16, 1973

[21] Appl. No.: 388,742

[52] U.S. Cl................................ 208/140; 252/415
[51] Int. Cl.².................... C10G 35/08; B01J 23/96
[58] Field of Search..................... 252/415; 208/140

[56] References Cited
UNITED STATES PATENTS

| | | | |
|---|---|---|---|
| 2,880,168 | 3/1959 | Feller................................ | 208/140 |
| 2,980,631 | 4/1961 | Craig et al.......................... | 208/139 |
| 3,134,732 | 5/1964 | Kearby et al....................... | 208/140 |
| 3,554,902 | 1/1971 | Buss................................. | 208/139 |
| 3,578,583 | 5/1971 | Buss................................. | 208/139 |
| 3,625,860 | 12/1971 | Condrasky......................... | 252/415 |
| 3,637,524 | 1/1972 | Johnson et al..................... | 252/415 |
| 3,673,109 | 6/1972 | Georgescu et al.................. | 252/415 |
| 3,684,693 | 8/1972 | Sinfelt.............................. | 208/138 |
| 3,707,509 | 12/1972 | Georgescu et al.................. | 208/139 |
| 3,764,557 | 10/1973 | Kluksdahl.......................... | 252/415 |

Primary Examiner—Winston A. Douglas
Assistant Examiner—P. E. Konopka
Attorney, Agent, or Firm—J. E. Luecke; John W. Ditsler

[57] ABSTRACT

Supported iridium-containing hydrocarbon conversion catalysts which are at least partially deactivated due to the deposition of carbonaceous residues thereon during contact with hydrocarbons are regenerated by (1) contacting the catalyst in a reaction zone with oxygen to burn at least a portion of the carbonaceous residues from the catalyst, (2) contacting the carbonaceous residuedepleted catalyst in a reaction zone with hydrogen at an elevated temperature to reduce a substantial portion of the iridium present on the catalyst to its metallic form, (3) contacting the treated catalyst in a reaction zone with an elemental halogen-containing gas in a reaction zone with an elemental halogen-containing gas at a temperature greater than about 850°F., said gas being introduced into said reaction zone at a rate such that the halogen concentration of the treating gas at the outlet of said reaction zone is at least 50% of the inlet halogen concentration within at least 15 minutes from the time of the introduction of said treating gas into the inlet of said reaction zone, (4) contacting the treated catalyst in a reaction zone with hydrogen at an elevated temperature to reduce a substantial portion of the iridium present in the catalyst to its metallic form, and (5) contacting the catalyst from step (4) in a reaction zone with an elemental halogen-containing gas at a temperature of at least about 850°F. Steps (4) and (5) may be repeated, in sequence, at least one additional time to redisperse the iridium catalyst component to a highly active, high surface area state.

21 Claims, No Drawings

REGENERATION PROCEDURE

BACKGROUND OF THE INVENTION

1. Field of the Invention

The present invention relates to a method for regenerating supported iridium-containing hydrocarbon conversion catalyst. More particularly, the present invention relates to a multi-step process sequence for regenerating a supported iridium-containing hydrocarbon conversion catalyst that has been at least partially deactivated because of the presence of the iridium in the catalyst in a large crystallite, low surface area form.

2. Description of the Prior Art

The deactivation of nobel metal-containing hydrocarbon conversion catalyst due to the deposition on the catalyst of carbonaceous residues is a common refinery problem. Catalyst deactivation is particularly acute with respect to supported nobel metal-containing catalysts, such as platinum on alumina, employed in the hydroforming of naphtha feed stocks. Platinum-containing reforming catalysts are reactivated or regenerated by burning the coke or carbonaceous residues from the catalyst followed by a redispersion operation whereby the platinum contained on the catalyst, which is agglomerated with loss of surface area during the burning operation, is redispersed by treatment with chlorine or other halogen-providing reagents, alone or in combination with oxygen at elevated temperatures. The techniques useful for the reactivation of platinum-containing catalysts, such as those disclosed in U.S. Pat. Nos. 3,134,732 and 3,625,860, are not directly applicable for the redispersion of iridium. Unlike platinum, iridium tends to agglomerate to crystallites of low surface area when exposed to a halogen-free, oxygen-containing gas at temperatures in excess of about 700° F. Further, unlike platinum, large iridium and iridium oxide crystallites are not readily redispersed to their high surface area state by a simple chlorine treatment immediately following the burning operation used to remove carbonaceous residues.

It has been discovered that iridium present on a supported catalyst can be redispersed to a high surface area state by contacting the catalyst, after the removal of carbonaceous residues, by subjecting the catalyst to one or more sequential reduction/halogenation cycles. Ordinarily, a plurality of such reduction/halogenation cycles are needed to completely redisperse the iridium. Because of the time involved in subjecting the catalyst to a plurality of such reduction/halogenation cycles and the corrosive nature of such treatment operations, it is desirable that a number of such reduction/halogenation cycles to which the catalyst is subjected be held to a minimum.

SUMMARY OF THE INVENTION

In accordance with the present invention, it has been discovered that the number of reduction/halogenation cycles needed to redisperse the iridium following a carbonaceous residue burning operation can, in some cases, be diminished by conducting the burning operation at reduced temperatures and by providing the catalyst with rapid, elevated temperature halogen protection prior to conducting the elevated temperature reduction/halogenation cycles needed to redisperse the iridium catalyst metal. The first step of the regeneration sequence comprises contacting the carbonaceous reisdue-containing catalyst with a gaseous mixture containing oxygen at an elevated temperature for a time sufficient to burn at least a portion of the carbonaceous residues from the catalyst. The duration of the burning operation at the selected burning temperature should be insufficient to convert more than about 70 wt. % of the iridium on the catalyst to crystalline agglomerates having crystallite sizes greater than about 50A (length of a side of an assumed cubic crystallite). A burning operation conducted at temperatures below about 850° F. is normally insufficient to convert more than about 70 wt. % of the iridium on the catalyst to iridium metal and/or iridium oxide agglomerates having crystallite sizes greater than about 50A.

The resulting carbonaceous residue-depleted, partially agglomerated iridium-containing catalyst is then contacted, prior to contact with a substantially halogen-free, oxygen-containing gas at a temperature sufficient to agglomerate further the iridium on said catalyst, with a hydrogen-containing gas at an elevated temperature for a time sufficient to convert a substantial portion of the iridium on the catalyst to its metallic state. The reduced catalyst is then contacted with elemental halogen, preferably elemental chlorine, at a temperature greater than about 850° F. at high treating rates to provide protection for the dispersed iridium present on the reduced partially agglomerated catalyst against further agglomeration. The contacting of the reduced catalyst with elemental halogen is conducted at a rate such that the halogen concentration of the treating gas at the outlet of the reaction zone containing the catalyst is at least 50% of the inlet halogen concentration within at least about 15 minutes from the time of introduction of the treating gas into the inlet of the reaction zone containing the catalyst.

Thereafter the protected catalyst is subjected to a redispersion operation involving contacting the protected catalyst with one or more sequential reduction/halogenation treatment cycles. Each such treatment cycle consists of (a) contacting the catalyst with a hydrogen-containing gas at an elevated temperature for a time sufficient to convert a substantial portion of the iridium present on the catalyst to its metallic state and (b) contacting the reduced catalyst with an elemental halogen-containing gas, preferably chlorine, at a temperature of at least about 850° F. A sufficient number of reduction/halogenation cycles are used to increase the surface area of the iridium metal present on the catalyst to at least 200 square meters per gram ($m^2/gm$.) of iridium as determined by the carbon monoxide chemisorption method described by Yates and Sinfelt, J. Catalysis, 8 348 (1967).

The supported iridium-containing catalyst composites that are regenerated by the process of the present invention comprise a porous carrier or support material in combination with an iridium component and, for certain uses, a halogen component. The support component of the catalyst is preferably a porous, adsorptive material having a surface area, as determined by the Brunauer-Emmett-Teller (BET) method, of about 20 to 800, preferably 100 – 300 square meters per gram. This support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as kieselguhr, kaolin, china clay, Attapulgus clay, etc.; (b) aluminosilicate zeolite materials such as naturally occurring or synthetic erionite, mordenite, faujasite, etc. that may or may not be previously converted to a hydrogen or ammonia form and reduced in soda content by virtue of an exchange reaction with various metal cations, including rare earth metal cations: (c) refractory inorganic oxides, including alumina, titanium dioxide, zinc oxide, magnesia, thoria, chromia, silica-alumina, alumina-titania, silica-zirconia, alumina-chromia, etc. and (d) mixtures of one or more of the materials referred to above.

Refractory inorganic oxide materials are preferred catalyst support materials. In general, superior results are obtained when alumina, in particular the gamma or eta forms, is employed. Alumina is the preferred catalyst support material when the catalyst is employed in naphtha reforming operations. The support materials described above are known articles of commerce and can be prepared for use as catalyst constituents by many varied techniques. Typically, the support materials are prepared in the form of spheres, granules, powders, extrudates or pellets. The precise size or shape of the support material used is dependent upon many engineering factors not within the purview of the instant invention.

As noted above, the regeneration process of the instant invention is particularly adapted to the treatment of deactivated iridium-containing catalysts. Iridium may be the sole catalyst metal present on the support; however, iridium may also be used in combination with other Group VIII metals or metals from Groups IB, VIA or VIIA of the Periodic Table of the Elements. More specifically, the iridium may be used in conjunction with one or more additional catalyst metals selected from copper, silver, gold, iron, cobalt, nickel, tungsten, molybdenum, chromium, platinum, palladium, rhodium, ruthenium, osmium, manganese or rhenium. The catalysts may also contain germanium, tin or lead. Particularly effective naphtha reforming catalysts are combinations of iridium and platinum. Most preferably, the catalyst metals are present in the form of highly dispersed clusters of atoms of said metals.

Certain minimum amounts of iridium, alone or in combination with additional catalyst metals, should be present on the catalyst. This is particularly true with respect to catalysts employed in a naphtha reforming operation where the catalyst should contain greater than about 0.1 wt. % iridium, based upon the dry weight of the total catalyst. For other types of operations, lesser quantities of iridium may be employed. Specifically, iridium may be present on the catalyst in amounts varying from about 0.01 to about 3.0 wt. %, preferably in amounts varying from about 0.1 to about 3.0 wt. %, preferably in amounts varying from about 0.1 to about 1.0 wt. %, based upon the total weight of the dry catalyst. Typically, any additional catalyst metals, such as platinum, are present in the catalyst in amounts varying from about 0.01 to 3.0 wt. % preferably 0.1 to 1.0 wt. %, based upon the dry weight of the catalyst. Iridium/platinum naphtha reforming catalysts having maximum effectiveness normally contain 0.15 to 1.0 wt. % each, preferably about 0.15 to 0.5 wt. % each, of iridium and platinum, based on total catalyst.

Iridium-containing catalysts may be prepared employing simple impregnation techniques. Such a catalyst may be prepared by impregnating a support material with a solution of a soluble iridium compound and soluble compounds of any additional metals to be incorporated in the catalyst. Generally, an aqueous solution of the metal compounds is used. In the case of multimetallic systems, the support material may be impregnated with the various metal-containing compounds either sequentially or simultaneously. However, it is highly desirable that the metal compounds, in the case of a polymetallic system, be impregnated on the catalyst support simultaneously to maximize the desired interaction between the metal components and thereby promote the formation of a highly dispersed polymetallic cluster structure in the final reduced form of the catalyst. The carrier material is impregnated with solutions of appropriate concentration to provide the desired quantity of metal in the finished catalyst. In the case of iridium-containing catalysts, compounds suitable for the impregnation of iridium onto the carrier include, among others, chloroiridic acid, iridium tribromide, iridium trichloride, and ammonium chloroiridate. Additional catalyst metals may be incorporated onto the support by employing compounds such as chloroplatinic acid, ammonium chloroplatinate, platinum amine salts, perrhenic aicd, ruthenium trichloride, rhodium trichloride, rhodium nitrate, palladium chloride, palladium amine salts, osmium trichloride, chloroosmic acid, auric chloride, chloroauric acid, silver nitrate, copper nitrate, copper chloride, ferric nitrate, cobalt nitrate, nickel nitrate, etc. The preferred catalyst manufacturing technique involves contacting a previously prepared support, such as alumina, with an aqueous solution of an iridium compound, alone or in combination with a compound of at least one additional catalyst metal.

After impregnation of the carrier, the composite catalyst is dried at a temperature varying from about 220° to 250° F. The catalyst may be dried in air at the above-stated temperatures or may be dried by treating the catalyst in a flowing stream of inert gas or hydrogen. The drying step may be followed by an additional calcination step at temperatures of about 500°–700° F. Care must be taken to avoid contacting the catalyst at temperatures in excess of about 700° F. with air or other gases of high oxygen concentration. If the catalyst is contacted with oxygen at too high a temperature, at least a portion of the iridium present will be oxidized, with loss of surface area, to crystallites of iridium oxide. In the case of polymetallic systems, the desired polymetallic cluster structure will not be obtained on reduction.

Additional materials may be added to the iridium-containing catalyst composite to assist in the promotion of various types of hydrocarbon conversion reactions for which the catalyst might be employed. For example, the naphtha reforming activity of the catalyst is enhanced markedly by the addition of a halogen moiety, particularly a chlorine or fluorine moiety, to the catalyst. The halogen should be present in the catalyst in amounts varying from about 0.1 to about 3.0 wt. %, based on the total dry weight of the catalyst. The halogen may be incorporated into the catalyst at any suitable stage in the catalyst manufacturing operation, i.e., before, during or after incorporation of the active metal component onto the support material. Halogen is often incorporated into the catalyst by impregnating the support with halogen-bearing metal compounds such as chloroiridic acid. Further amounts of halogen may be incorporated in the catalyst by contacting it with hydrogen fluoride, ammonium fluoride, hydrogen chloride, or ammonium chloride, either prior to or subsequent to the impregnation step. Other components may also be added to the catalyst composite. For example, the catalyst may be sulfided before or during use. For certain applications other than naphtha reforming, alkali or alkaline earth metal compounds may be added to the catalyst.

The iridium-containing catalyst composites may be used to promote a wide variety of hydrocarbon conversion reactions such as hydrocracking, isomerization, dehydrogenation, hydrogenation, alkylation, polymerization, cracking, and the like. The catalysts are particularly useful in promoting the dehydrogenation, isomerization, dehydrocyclization and hydrocracking reactions that occur in a naphtha hydroforming process.

In a naphtha hydroforming process (reforming) a substantially sulfur-free naphtha stream that typically contains about 15 to 80 volume % paraffins, 15 to 80 volume % naphthenes and about 2 to 20% aromatics and boiling at atmospheric pressure substantially between about 80° and 450° F., preferably between about 150° and 375° F., is contacted with the iridium-containing catalyst composite in the presence of hydrogen. The reactions typically occur in a vapor phase at a temperature varying from about 650° to 1000° F., preferably about 750° to 980° F. Reaction zone pressures may vary from about 1 to 50, preferably from about 5 to 30 atmospheres. The naphtha feed stream is passed over the catalyst composite at space velocities varying from about 0.5 to 20 parts by weight of naphtha per hour per part by weight of catalyst (W/hr./W), preferably from about 1 to 10 W/hr./W. The hydrogen to hydrocarbon mole ratio within the reaction zone is maintained between about 0.5 and 20, preferably between about 1 and 10. During the reforming process, the hydrogen used may be in admixture with light gaseous hydrocarbons. In a typical operation, the catalyst is maintained as a fixed bed within a series of adiabatically operated reactors. The product stream from each reactor (except the last) in the reactor train is reheated prior to passage to the following reactor. As an alternate to the above-described process, the catalyst may be used in a moving bed in which the naphtha charge stock, hydrogen and catalyst are passed in parallel through the reactor or in a fluidized system wherein the naphtha feed stock is passed upwardly through a turbulent bed of finely divided catalyst particles. Finally, if desired, the catalyst may be simply slurried with the charge stock and the resulting mixture conveyed to the reaction zone for further reaction.

Regardless of the hydrocarbon conversion reaction in which iridium-containing catalyst composites are employed, the catalyst tends to deactivate after use due at least in part to the formation of coke or carbonaceous residues on the surface of the catalyst. The carbonaceous residues on the surface of the catalyst cover the active catalyst sites and thus decrease activity. Accordingly, it becomes necessary to remove the carbonaceous deposits from the catalyst in order to return the catalyst to an economically viable activity level.

Turning now in more detail to the regeneration process of the present invention, the first step in the regeneration sequence consists of treating the catalyst with oxygen to burn at least a portion of the accumulated carbonaceous deposits from the catalyst. The temperature and duration of the burning operation are selected to avoid converting more than about 70 wt. % of the iridium on the catalyst to agglomerates having crystallite sizes greater than about 50A. Crystallites of greater than about 50A are detectable using X-ray diffraction techniques. The burning operation is conducted at a temperature not exceeding about 850° F. preferably a temperature not exceeding about 800° F. The coke burning operation is normally carried out by contacting the catalyst with oxygen contained in minor concentrations in a substantially sulfur-free inert gas, preferably flue gas. Minor oxygen concentrations, typically varying between 0.1 to 0.5 mole % of the total treating gas, are desirable in order to maintain a maximum burning temperature of less than about 850° F. Following the completion of the burning operation, the catalyst may be subjected to an after-treatment operation by contacting the catalyst with a burning gas containing from 0.3 to 21 mole %, preferable from about 6 to 10 mole % oxygen, at a temperature of less than about 850° F. Higher oxygen concentrations can be tolerated after the initial burning step since the bulk of the carbonaceous residues are removed in the initial burning operation. Reaction zone pressures during the burning operation vary from about 0.1 to 30, preferably 5 to 20 atmospheres. The low temperature burning operation is remarkedly effective for the substantially complete removal of carbonaceous residues. The catalyst, after completion of the burning operation, desirably contains less than about 0.3 wt. % carbonaceous residues, based upon the dry weight of the total catalyst. Normally, the burning operation in a commercial environment is completed in 1 to 100, preferably 5 to 40 hours.

Following the burning operation, it is desirable that the carbonaceous residue depleted catalyst be contacted with a substantially oxygen-free inert gas, preferably nitrogen, to remove from the reaction zone any carbon monoxide, carbon dioxide and oxygen remaining after the burning operation. Because of the presence of oxygen within the reaction zone, it is desirable that the purging operation be carried out at a temperature below about 750° F., preferably below about 650° F. The purging operation can be achieved by sweeping nitrogen through the reaction zone containing the catalyst. Alternatively, the reaction zone may be pressurized up to about 3 to 4 atmospheres with nitrogen and then depressurized.

Following the purging operation, if used, the catalyst is subjected to a reduction treatment wherein the catalyst is contacted with hydrogen in an inert gas at a temperature varying from about 400° to 1100° F., preferably from about 650° to about 950° F. in order to convert (reduce) a substantial portion of the iridium present on the catalyst to its metallic state. Following the reduction operation, it is desirable that the reaction zone containing the catalyst be purged with an inert gas, preferably nitrogen, in the manner described above with respect to the purging operation following the burning step. The purging operation serves to remove unreacted hydrogen from the reaction zone.

Following the reduction operation, the reduced catalyst is contacted with an elemental halogen-containing gas, preferably a chlorine-containing gas, at a temperature of at least about 850° F., preferably at a temperature ranging from about 850° F. to 1150° F. most preferably at a temperature of from 900° to 1000° F. As noted earlier, the halogen pretreatment operation should be conducted at high treat rate, specifically the halogen-containing gas should be introduced into the reaction zone containing the catalyst at a rate such the halogen concentration of the treating gas at the outlet of the reaction zone is at least 50% of the inlet halogen concentration within at least about 15 minutes, preferably within at least about 10 minutes, from the time of introduction of said treating gas into the inlet of the reaction zone. The halogen treating operation may be continued after the initial treat has been completed, that is, after the 15 minute period, preferably 10 minute period after the halogen concentration in the outlet gases is at least 50% of the halogen concentration in the inlet gases. Preferably, the halogen treatment operation is continued for a time sufficient to introduce from about 0.1 to 4.0, preferably 0.5 to 2.0 wt. % halogen onto the catalyst, based upon the anhydrous weight of the catalyst. It has been discovered that the rapid contacting of the catalyst with elemental halogen, even at temperatures in excess of about 850° F., serves to diminish the further agglomeration of the nonagglomerated iridium present on the catalyst during subsequent redispersion operations. Because the halogen treating operation is conducted rapidly, the halogen treat gas may optionally contain oxygen in significant quantities. Preferably the treat gas is substantially oxygen-free; however, when oxygen is present, the molar ratio of oxygen to elemental halogen in the treat gas should be maintained below about 10:1. Preferably, the oxygen to halogen molar ratio is 1:1 or less. The treating gas may also contain water in concentrations varying from about 0.005 to 10.0%, preferably 0.02 to 1.0% by volume of the total treat gas. The pressure within the reaction zone during the time of the rapid halogen treatment may vary from about 0.1 to 30, preferably 5 to 20 atmospheres.

After the catalyst has been pretreated with halogen, preferably chlorine, the catalyst is subjected to one or more reduction/halogenation cycles in order to redisperse agglomerated iridium on the catalyst, that is, to increase the iridium surface area of the catalyst to a level greater than about 200 m²/gm., as determined by the aforementioned carbon monoxide chemisorption technique. This metal surface area corresponds to an average iridium particle size (length of a side of an assumed cubic crystallite) of less than about 11A.

The reduction step of the redispersion operation is accomplished by contacting the halogen treated catalyst with a hydrogen-containing gas, preferably hydrogen contained in nitrogen, at a temperature varying from about 400° to 1100° F., preferably from about 650° – 950° F. Preferably, the treating gas is substantially sulfur free. The contacting of the catalyst with the hydrogen-containing gas is carried out for a time sufficient to convert at least a portion, preferably a substantial portion, of the catalyst iridium to its metallic form. The pressure within the contacting zone during reduction can vary from about 0.1 to 30, preferably 5 to 20 atmospheres.

Following the reduction operation, the reaction zone containing the catalyst may be purged in the manner described earlier with respect to the purging operation following the burning step to remove unreacted hydrogen. Thereafter, the reduced catalyst is contacted with an elemental halogen containing gas, preferably a chlorine-containing gas, at a temperature greater than about 850° F., preferably at a temperature varying from greater than about 850° F. to 1150° F., most preferably at 900° – 1000° F. The reaction zone pressure during the halogenation operation is maintained between about 0.1 to 30 atmospheres, preferably between about 5 to 30 atmospheres. The halogen employed in the treating operation is preferably used in admixture with an inert gas, such as nitrogen. Preferably the concentration of halogen in the treating gas mixture is relatively low, that is, the halogen partial pressure in the treating gas mixture varies from about 0.0001 to 1.0, preferably 0.01 to 0.1 atmospheres. The contacting of the catalyst with the halogen-containing gas is generally continued for a time sufficient to incorporate from 0.1 to 4.0 wt. %, preferably 0.5 to 2.0 wt. %, additional halogen onto the catalyst, based upon the anhydrous weight of the catalyst.

While elemental halogen, preferably chlorine, is an essential constituent of the treating gas, other materials may be present in the treating gas mixture. For example, the gas mixture may contain water, hydrogen halides, oxygen, and the like. When oxygen is present in the treating gas, the molar ratio of oxygen to elemental halogen in the treating gas should be maintained below about 10:1, preferably 1:1 or less. It is desirable that minor quantities of oxygen be present in the treating gas. It is believed that the presence of oxygen in the halogen-containing treating gas aids in the redispersion of the metals present on the catalyst. The presence of water in the treating gas mixture is beneficial from a corrosion standpoint. The water concentration of the treating gas, if water is present, should be maintained at levels varying from about 0.005 to 10%, preferably 0.02 to 1.0% by volume of the total treating gas.

The required halogen may be introduced directly into the reaction zone containing the catalyst or may be generated in situ by the thermal and oxidative degradation of materials containing halogen. For example, chlorine may be generated by the in situ oxidation of hydrogen chloride. Similarly chlorine may be generated by the thermal and/or oxidative degradation of $C_1 - C_4$ chlorinated hydrocarbons such as carbon tetrachloride, trichloroethylene, ethylene dichloride, t-butyl chloride, etc.

Upon completion of the inital hydrogen reduction/halogen treatment redispersion cycle following rapid halogen treatment of the catalyst, the catalyst may be subjected to additional reduction/halogen treatment cycles if the desired degree of iridium dispersion is not secured with a single cycle. Generally, from one to six additional cycles may be employed in order to completely convert the iridium present in the catalyst to a metallic surface area greater than about 200 m²/gm. Because of the deleterious effects encountered by contacting supported iridium-containing catalysts with oxygen at elevated temperatures, it is important that the catalyst, after completion of the initial reduction operation and prior to reuse in the hydrocarbon conversion operation, not be contacted with a substantially halogen-free, oxygen-containing gas at a temperature sufficient to agglomerate further the iridium on the catalyst. The degree of iridium agglomeration encountered with contacting the catalyst with oxygen is a function of the temperature and duration of contacting. Prolonged contact with oxygen at temperatures in excess of about 700° F. should be avoided. Prior to the initial reduction, the catalyst should not be contacted with a substantially halogen-free oxygen-containing gas at a temperature substantially greater than the maximum temperature employed in the burning operation to avoid further agglomeration of the iridium catalyst metal. Further, it is preferred that all of the steps of the regeneration process be carried out sequentially and without interruption. There is no necessity for cooling the catalyst between the reduction and halogenation steps of the redispersion operation. It is preferred that the reduction/halogenation steps of the redispersion treatment be completed without reducing the temperature of the catalyst below about 575° F.

The regeneration process of the present invention is generally carried out in situ, that is, the catalyst treated is maintained within the reactor vessels in which the hydrocarbon conversion reactions are carried out. Also, the regeneration process may be conducted in a separate regenerator vessel. Typically, the regeneration sequence is commenced by discontinuing contacting the catalyst with the process feed stock and the feed stock purged from the reaction vessels using techniques known to those skilled in the art. Thereafter, nitrogen is circulated through the reactor(s) at an elevated temperature and oxygen slowly introduced into the circulating nitrogen stream in order to burn carbonaceous residues from the catalyst. Following the burn operation, the reaction zone containing the catalyst may, if desired, be purged of $O_2$, CO, and $CO_2$ by circulating nitrogen gas therethrough. The catalyst is reduced thereafter by introducing hydrogen into the circulating nitrogen stream being passed through the reaction zone. After the desired degree of reduction is secured, the introduction of hydrogen into the circulating nitrogen gas is discontinued and elemental chlorine introduced into the circulating stream. Optionally, the reaction zone may be purged using an inert gas purge before introduction of the elemental halogen. Initially the chlorine reacts with the hydrogen remaining in the circulating stream to form hydrogen chloride (if no purge is used); however, after the remaining hydrogen is consumed, the catalyst is contacted rapidly with elemental chlorine. After rapid chlorine protection is achieved, the reaction zone is purged of chlorine treat gas with an inert gas purge and the catalyst is reduced following the procedure described above. After purging the reaction zone of reducing gas with an inert purge gas, the catalyst is contacted with elemental chlorine contained in the circulating nitrogen stream at a temperature in excess of about 850° F. Following the initial reduction/chlorination dispersion sequence, the sequence may be repeated at least one additional time in order to redisperse further the iridium present on the catalyst.

A preferred embodiment of the present invention involves reversing the direction of flow of the halogen-containing gas with each halogenation treatment. For example, in the first treatment with halogen, the halogen may be passed downwardly over the catalyst. In the second treatment, (after an intervening reduction step) the halogen treat gas is passed upwardly over the catalyst. In the next cycle, the halogen-containing gas is passed downwardly over the catalyst.

After the desired degree of redispersion is secured, the catalyst is treated with hydrogen alone or in combination with process feed stock and returned to use without further contact with a halogen-free, oxygen-containing gas at a temperature sufficient to form crystalline agglomerates of the iridium, e.g., temperatures in excess of about 700° F. Prior to use, the catalyst may be contacted with hydrogen sulfide or other sulfur donor contained in hydrogen or an inert gas at an elevated temperature in order to sulfide the catalyst. The sulfiding operation is typically conducted for a time sufficient to add from about 0.03 to 0.15 wt. % sulfur on the catalyst, based upon the dry weight of the catalyst.

DESCRIPTION OF THE PREFERRED EMBODIMENTS

The following examples illustrate further the regeneration process of the present invention.

EXAMPLE 1

An experiment illustrating the advantage secured using the fast breakthrough regeneration technique of the present invention was conducted. A 1 inch diameter silica glass tubular reactor, 36 inches long, was employed to retain the catalyst being treated. The experiment was conducted at atmospheric pressure. In this and the following example, a 0.3 wt. % iridium/0.3 wt. % platinum on alumina catalyst was utilized. A typical preparative procedure for manufacturing the catalyst includes contacting 100 grams of alumina (in the form of 1/16 inch extrudates) with a solution containing both iridium and platinum salts. The solution is prepared by admixing 150 milliliters of distilled water with 3 milliliters of chloroiridic acid solution containing 0.1 gram of iridium per milliliter of solution and 3 milliliters of a chloroplatinic acid solution containing 0.1 gram of platinum per milliliter of solution. The alumina is added to the water solution and left for several hours at room temperature. After removing excess water, the catalyst is dried in air at 110° C. for 16 hours and then at 250° C. for 3 hours.

The catalysts used in this example were previously employed to promote a naphtha reforming operation. At the end of the on-oil cycle, carbonaceous residues were burned from the catalyst at conditions such that none of the platinum was converted to crystallites detectable by X-ray diffraction (i.e., larger than about 50A). Approximately 14 wt. % of the iridium on the catalyst was present in the form of crystallites having particle size greater than about 50A.

One hundred grams of the catalyst were charged to the silica reactor and maintained therein in two discrete beds of 50 grams each. The catalyst was then treated using a fast breakthrough chlorination procedure defined by the following sequence of steps:

(1) The catalyst was heated from room temperature to 950° F. in flowing hydrogen and held at 950° F. under the same conditions for one hour. All subsequent steps were conducted at 950° F.

(2) Hydrogen flow over the catalyst was then halted and the hydrogen purged from the system by flowing helium through the catalyst beds.

(3) A treating gas comprising 1 volume % chlorine in nitrogen was then passed over the catalyst at a rate producing a chlorine breakthrough at the exit of the bed in 4⅓ minutes.

(4) One minute after breakthrough the flow rate was reduced by a factor of about 30 and the direction of flow of the chlorine/nitrogen mixture was reversed and was continued for 1 hour.

(5) Thereafter helium was passed through the beds to purge the catalyst of excess chlorine and to cool the catalyst to room temperature.

An X-ray diffraction analysis of bed 1 showed that 19 wt. % of the iridium in the catalyst existed as large crystallites of metallic iridium. There were no detectable large crystallites of iridium oxide. The second catalyst bed had 10 wt. % of the iridium in the catalyst existing in the form of large crystallites of metallic iridium and no detectable iridium oxide crystallites. These results show that the protection technique did not materially increase the amount of agglomerated iridium on the catalyst as the average degree of agglomeration for the two beds is approximately equal to the degree of agglomeration for the starting catalyst and no iridium oxide was formed.

EXAMPLE 2

A comparative experiment to Example 1 was conducted wherein the chlorine breakthrough was secured after a relatively long treating time. The experimental arrangement employed was identical to that used in Example 1. The catalyst used in the test was previously employed to promote a naphtha reforming operation and after use was subjected to a burning operation for carbonaceous residue removal. The burning conditions were such that none of the platinum was found to be in the particle size range detectable by X-ray diffraction; however, approximately 25 wt. % of the iridium of the catalyst employed was in the form of large (greater than about 50A) particles.

One hundred grams of the above catalyst were charged to the tubular reactor and maintained therein in two discrete beds of 50 grams each. The catalyst was treated in accordance with the following sequence of steps:

(1) The catalyst was heated from room temperature to 930° F. in flowing hydrogen and then held at 930° F. under the same conditions for 0.5 hour. All subsequent steps were conducted at 930° F.

(2) Thereafter hydrogen flow was halted and hydrogen purged from the reactor by flowing helium through the beds.

(3) A treating gas comprising 1 volume % chlorine in nitrogen was then passed over the catalyst at a rate which produced a chlorine breakthrough at the exit side of the catalyst beds in about 37 minutes.

(4) At breakthrough the rate of flow of the treating gas was reduced by a factor of 6 giving a flow rate approximately that used in step (4) of Example 1. This flow was continued at 930° F. for 9.5 hours.

(5) Thereafter chlorine flow was halted and helium passed through the catalyst beds to purge the catalyst of excess chlorine and to cool the catalyst to room temperature.

X-ray diffraction examination of bed 1 showed 10 wt. % of the total iridium on the catalyst was present as detectable elemental iridium and 29 wt. % as detectable iridium oxide giving a total of 39 wt. % of iridium in the catalyst in large particle size, catalytically inactive form. The iridium of the second bed consisted of 31 wt. % detectable elemental iridium and 24 wt. % detectable iridium oxide giving a total of 55 wt. % of large particle size iridium. As evident by comparing the results of this example with the results of Example 1, the overall agglomeration of the catalyst in the slow breakthrough experiment became substantially larger, particularly by the formation of relatively large quantities of large particle size iridium oxide.

What is claimed is:

1. In a process for the catalytic reforming of hydrocarbons wherein a hydrocarbon feed stock is contacted with a catalyst comprising from about 0.01 to about 3.0 wt. % of an iridium component contained on a refractory inorganic oxide support at reforming conditions, the catalyst having been at least partially deactivated during contact with said feed stock by the deposition of carbonaceous residues, a method for regenerating said catalyst after discontinuing said contact of said catalyst with said feed stock comprising:

1. contacting said catalyst in a reaction zone with a gaseous mixture containing oxygen at an elevated temperature for a time sufficient to burn a substantial portion of said carbonaceous residues from said catalyst, the duration of said contacting at said elevated temperature being insufficient to convert more than about 70 wt. % of the iridium on said catalyst to agglomerates having crystalline sizes greater than about 50A;

2. contacting said carbonaceous residue-depleted catalyst in said reaction zone with a hydrogen-containing gas at an elevated temperature for a time sufficient to convert a substantial portion of said iridium to its metallic form, said step (2) being effected prior to contact with a substantially halogen-free, oxygen-containing gas at a temperature sufficient to agglomerate further the iridium on said catalyst;

3. contacting said treated catalyst having a substantial portion of the iridium contained thereon in the metallic form in said reaction zone with an elemental halogen-containing gas at a temperature greater than about 850° F., said gas being introduced into said reaction zone at a rate such that the halogen concentration of the treating gas at the outlet of said reaction zone is at least 50% of the inlet halogen concentration within at least 15 minutes from the time of the introduction of said treating gas into the inlet of said reaction zone;

4. contacting said halogen treated catalyst in said reaction zone with a hydrogen-containing gas at an elevated temperature for a time sufficient to convert a substantial portion of said iridium to its metallic form; and 5. contacting said treated catalyst having a substantial portion of the iridium contained thereon in the metallic form in said reaction zone with an elemental halogen-containing gas at a temperature of at least about 850° F. for a time sufficient to redisperse at least a portion of the iridium on the catalyst.

2. The process of claim 1 wherein, after completion of said step (1), said catalyst is contacted with an inert purge gas at a temperature of below about 750° F. for a time sufficient to remove substantially all of the carbon dioxide, carbon monoxide and oxygen present in said reaction zone.

3. The process of claim 1 wherein said steps (4) and (5) are repeated, in sequence, at least one additional time.

4. The process of claim 1 wherein said halogen-containing gas employed in steps (3) and (5) is a chlorine-containing gas.

5. The process of claim 2 wherein said halogen-containing gas employed in said steps (3) and (5) is a chlorine-containing gas.

6. The process of claim 1 wherein said steps (2) and (4) are conducted at a temperature varying from about 650° to 950° F.

7. The process of claim 2 wherein said steps (2) and (4) are conducted at a temperature varying from about 650° to 950° F.

8. The process of claim 5 wherein said steps (2) and (4) are conducted at a temperature varying from about 650° to 950° F.

9. In a process for the catalytic reforming of a naphtha feed stock wherein said naphtha feed stock and hydrogen are contacted with a catalyst comprising from about 0.01 to about 3.0 wt. % of an iridium component and a halogen component contained on an alumina support at naphtha reforming conditions, the catalyst having been at least partially deactivated during contact with said naphtha feed stock by the deposition of carbonaceous residues, a method for regenerating said catalyst after discontinuing contact of said catalyst with said feed stock comprising;

1. contacting said catalyst in a reaction zone with a gaseous mixture containing oxygen at an elevated temperature for a time sufficient to burn a substantial portion of said carbonaceous residues from said catalyst, the duration of said contacting at said elevated temperature being insufficient to convert more than about 70 wt. % of the iridium on said catalyst to agglomerates having crystallite sizes greater than about 50A;

2. contacting said carbonaceous residue-depleted catalyst in said reaction zone with a gas mixture containing hydrogen at a temperature varying from about 650°–950° F. for a time sufficient to convert a substantial portion of said iridium to its metallic form, wherein said step (2) is effected prior to contact with a substantially halogen-free, oxygen-containing gas at a temperature sufficient to agglomerate further the iridium on said catalyst;

3. contacting said treated catalyst having a substantial portion of the iridium contained thereon in the metallic form in said reaction zone with a gas mixture containing chlorine at a temperature of greater than about 850° F., said gas mixture being introduced into said reaction zone at a rate such that the chlorine concentration of the treating gas at the outlet of said reaction zone is at least 50% of the inlet chlorine concentration within at least 15 minutes from the time of the introduction of said treating gas into the inlet of said reaction zone;

4. contacting said chlorine treated catalyst in a reaction zone with a gas mixture containing hydrogen at a temperature varying from about 650° to 950° F. for a time sufficient to convert a substantial portion of said iridium to its metallic form;

5. contacting said treated catalyst having a substantial portion of the iridium contained thereon in the metallic form in said reaction zone with a gas mixture containing chlorine at a temperature greater than about 850° F. for a time sufficient to redisperse at least a portion of the iridium on the catalyst; and 6. contacting said treated catalyst from step (5) in a reaction zone with said naphtha feed stock and hydrogen at naphtha reforming conditions, wherein said step is effected prior to contact with a substantially halogen-free, oxygen-containing gas at a temperature sufficient to agglomerate the iridium on said catalyst.

10. The process of claim 9 wherein said step (1) operation is conducted at a temperature of less than about 850° F.

11. The process of claim 9 wherein said steps (3) and (5) are conducted at a temperature varying from about 850° to 1150° F.

12. The process of claim 9 wherein, after completion of said step (1), said catalyst is contacted with an inert purge gas at a temperature of below about 750° F. for a time sufficient to remove substantially all of the carbon dioxide, carbon monoxide and oxygen present in said reaction zone.

13. The process of claim 9 wherein said steps (4) and (5) are repeated, in sequence, at least one additional time.

14. The process of claim 9 wherein said hydrogen-containing gas is substantially removed from the reaction zone prior to each of said subsequent steps wherein said catalyst is contacted with a chlorine-containing gas and said chlorine-containing gas is substantially removed from said reaction zone prior to contacting said catalyst with said hydrogen-containing gas.

15. The process of claim 12 wherein said hydrogen-containing gas is substantially removed from the reaction zone prior to each of said subsequent steps wherein said catalyst is contacted with a chlorine-containing gas and said chlorine-containing gas is substantially removed from said reaction zone prior to contacting said catalyst with said hydrogen-containing gas.

16. The process of claim 13 wherein said hydrogen-containing gas is substantially removed from the reaction zone prior to each of said subsequent steps wherein said catalyst is contacted with a chlorine-containing gas and said chlorine-containing gas is substantially removed from said reaction zone prior to contacting said catalyst with said hydrogen-containing gas.

17. The process of claim 1 wherein the halogen-containing gas of steps (3) and (5) contains water in amounts ranging from about 0.02 to 1.0% by volume, based on total treat gas.

18. The process of claim 1 wherein the halogen-containing gas in steps (3) and (5) contains oxygen, the molar ratio of oxygen to elemental halogen in said halogen-containing gas being less than about 10:1.

19. The process of claim 9 wherein the gas mixture in steps (3) and (5) comprises chlorine and oxygen, the molar ratio of oxygen to chlorine in said gas mixture being less than about 10:1.

20. The process of claim 9 wherein the contacting in steps (3) and (5) is continued for a time sufficient to introduce from 0.1 to 4.0 wt. % additional chlorine onto the catalyst.

21. The process of claim 1 wherein said steps (2) and (4) are conducted at a temperature varying from about 400° to 1100° F.

* * * * *